United States Patent [19]
Hill et al.

[11] Patent Number: 5,615,354
[45] Date of Patent: Mar. 25, 1997

[54] METHOD AND SYSTEM FOR CONTROLLING REFERENCES TO SYSTEM STORAGE BY OVERRIDING VALUES

[75] Inventors: Ronald F. Hill, Wappingers Falls; Donald W. McCauley, Pleasant Valley; Stephen J. Nadas, Poughkeepsie; James R. Robinson, Clinton Corners, all of N.Y.

[73] Assignee: International Business Machines Corporation, Armonk, N.Y.

[21] Appl. No.: 471,892

[22] Filed: Jun. 7, 1995

Related U.S. Application Data

[63] Continuation of Ser. No. 996,264, Dec. 23, 1992.

[51] Int. Cl.[6] .............................. B06F 9/06; B06F 13/10
[52] U.S. Cl. ........................................ 395/493; 395/483
[58] Field of Search ................................. 395/483, 493

[56] References Cited

PUBLICATIONS

"Milli–Code", IBM Technical Disclosure Bulletin, vol. 35, No. 4A, Sep. 1992, pp. 451–454.
"IBM System/390 Principles of Operation," Form No. SA22–7201–00. pp. 5–65 to 5–78 of Chapter 5. Program Execution.
"International Business Machines System 370 Extended Architecture Interpretative Execution," Publication No. SA22–7095–1.

*Primary Examiner*—Reba I. Elmore
*Attorney, Agent, or Firm*—Lynn L. Augspurger, Esq.; Heslin & Rothenberg, P.C.

[57] ABSTRACT

A method and system for controlling references to system storage. Milli-code mode provides a flexible technique for overriding storage controls associated with referencing system storage of a data processing system. The storage controls to be overridden are not replaced and therefore, a restore of the previous contents of those controls is not necessary. This allows for an increase in system performance and an increase in the efficiency and flexibility of the system. In addition to the above, a system request instruction is provided, which enables flexibility in the manner in which system requests are executed. The flexibility of the system request instruction reduces the number of instructions needed to perform system requests.

38 Claims, 3 Drawing Sheets

METHOD AND SYSTEM FOR CONTROLLING REFERENCES TO SYSTEM STORAGE BY OVERRIDING VALUES

This application is a continuation of application Ser. No. 07/996,264, filed Dec. 23, 1992.

TECHNICAL FIELD

This invention relates in general to data processing systems and, in particular, to a method and system for controlling references to system storage located within a data processing system.

BACKGROUND ART

In a data processing system, system storage needs to be accessed frequently and thus, efficiently so that system performance is not degraded. Typically, before system storage is accessed, one or more controls associated with accessing the system storage are set. These controls include, for instance, manipulation of storage keys, commands for expanded storage and controls associated with addressing modes.

Previously, in architectural systems, such as International Business Machines Corporation System 390, in order to alter one of the storage controls associated with accessing system storage, a System 390 instruction, as one example, was used to load the program status word with the desired control information, perform the storage access and then reload the program status word with the previous control information. The loading and reloading of the program status word or other control registers is time consuming and a degradation of system performance. Thus, a need exists for a technique in which storage controls used in accessing system storage can be overridden in a flexible and efficient manner.

Based on the foregoing, a need exists for a method and system for controlling references to system storage which provide flexibility and do not require the replacement of existing values set for storage controls. In addition, a need exists for a method and system for controlling references to system storage which enhance system performance. A yet further need exists for a technique for issuing system requests which is also flexible and does not require the creation of a new instruction to satisfy each and every system request desired.

DISCLOSURE OF INVENTION

The shortcomings of the prior art are overcome and additional advantages are provided through the provision of a method for controlling references to system storage in a data processing system. A reference to system storage is issued. Associated with the reference are a plurality of storage controls, each of which has a predefined value. The predefined value of one or more of the plurality of storage controls is overridden without replacing the predefined value. The reference to system storage is then executed using the plurality of storage controls.

In one embodiment, the overriding step includes loading a predetermined value for one or more of the plurality of storage controls in a control register and associating the control register with the issued reference to system storage. The control register include a register field and, in one example, the register field is set equal to a base register field of the issued reference to system storage.

In one example, the plurality of storage controls includes an address space control, an address truncation control, an exception filter control, a block program event recording control, a fetch-store control, an expansion bit control, an alternate key control, a control register control and an alternate key.

In another embodiment, the data processing system includes a set instruction and the loading of the predetermined values in a control register is performed using the set instruction.

In yet another embodiment, the data processing system is placed in a milli-code mode by setting a milli-code mode detection bit to a first value.

In another embodiment of the invention, the data processing system includes a storage controller having a plurality of controls. One or more of the plurality of controls are updated using, for example, a system request instruction. In one example, the system request instruction is associated with a control register.

In another aspect of the invention, a system for controlling references to system storage in a data processing system is provided. The system includes means for issuing a reference to system storage. The reference to system storage has a plurality of storage controls associated therewith and each of the plurality of storage controls has a predefined value. Means are also included for overriding the predefined value of one or more of the plurality of storage controls without replacing the predefined value and for executing the reference to system storage.

In another embodiment of the invention, the system further includes a storage controller located within the data processing system. The storage controller includes a plurality of controls and means for updating one or more of the plurality of controls is included. In one example, the updating means includes a system request instruction.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

BEST MODE FOR CARRYING OUT THE INVENTION

In accordance with the principles of the present invention, a technique for controlling references to system storage is provided. The technique of the present invention uses, for instance, milli-code in order to implement complex functions in a large hardware controlled pipelined general purpose digital computer without incorporating a microprocessor into its design. In order to implement these complex functions, milli-code controls references to system storage. Milli-code provides flexibility and facilitates referencing of system storage. The technique of the present invention may be used with a variety of computer architectures, such as International Business Machines Corporation Systems Architecture/390, the operation of which is described in "IBM System/390 Principles of Operation," Form No. SA22-7201-00, which is hereby incorporated by reference.

Figure 1:
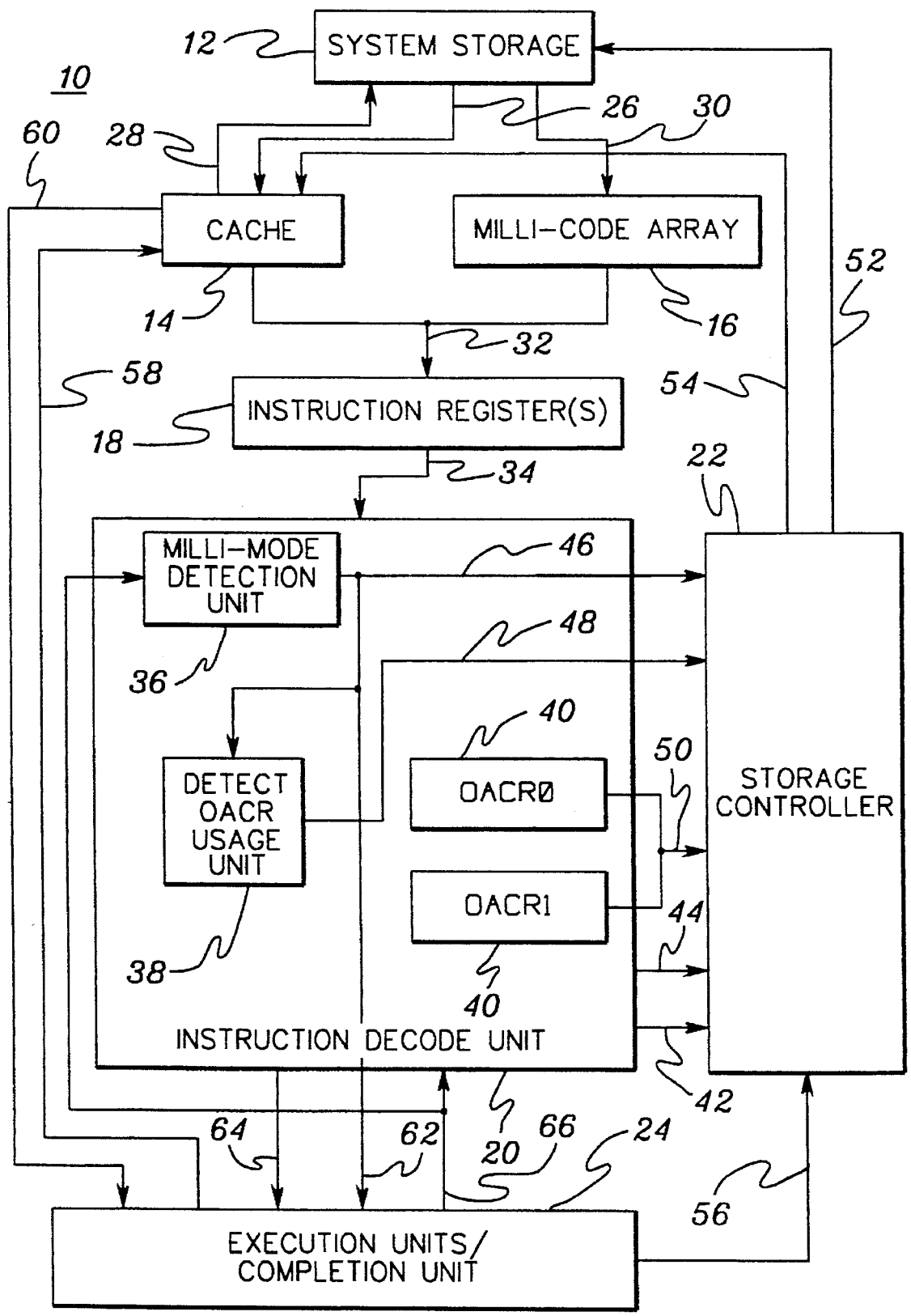
FIG. 1 depicts one embodiment of the hardware components associated with the storage referencing technique of the present invention.

Referring to FIG. 1, one example of the hardware components associated with the storage referencing technique of the present invention is described. As depicted in FIG. 1, the main hardware components associated with a system 10 include a system storage 12, a cache 14, a milli-code array 16, one or more instruction registers 18, an instruction decode unit 20, a storage controller 22 and one or more execution units/completion unit 24. Each of these components is described in detail below.

System storage 12 is referenced by the technique of the present invention, as described in detail below. System storage 12 is directly addressable storage which provides for high speed processing of data, programs and instructions by data processing system 10. The data, instructions and programs are loaded into system storage 12 from input devices (not shown). In addition, system storage 12 also includes non-user addressable storage, referred to as the system area, which also includes data, programs and instructions. As is depicted in FIG. 1, system storage 12 is coupled to cache 14 via buses 26 and 28 and to milli-code array 16 via bus 30.

Cache 14 is a faster-access buffer storage which includes, for example, instructions used in the 390 architecture and data received from system storage 12 via bus 26. Milli-code array 16 includes milli-instructions received, for instance, from system storage 12 via bus 30. The milli-instructions are used when the system overrides 390 mode with milli-code mode in accordance with the principles of the present invention, as described below. Instructions are passed from either cache 14 when the system is in 390 mode or from milli-code array 16 when the system is in milli-code mode to one or more instruction registers 18 via bus 32.

Instruction registers 18 are also coupled to instruction decode unit 20 via a bus 34. In one example, instruction decode unit 20 includes a milli-mode detection unit 36, which includes, for instance, standard logic circuits and is used in determining whether system 10 should enter milli-code mode; a detect operand address control register (OACR) usage unit 38, which also includes standard logic circuits and is used in determining whether the base register referenced in a particular instruction is equivalent to one of the milli-registers specified in an operand address control register (described below); and two operand address control registers 40 (e.g., OACR0 and OACR1), each of which receives controls associated with the referencing technique of the present invention. It will be apparent to one of ordinary skill in the art that the inventive technique is not limited to two operand address control registers. It is possible to have only one control register 40 for some operations or more than two operand address control registers. The fields associated with an operand address control register 40 are described in detail further below.

Instruction decode unit 20 is coupled to storage controller 22 via buses 42 and 44. In addition, the components of the decode unit are coupled to the storage controller via several buses. In particular, milli-mode detection unit 36 is coupled to storage controller 22 via a bus 46, detect OACR usage unit 38 is coupled to the storage controller via a bus 48 and operand address control registers 40 are coupled to the controller via a bus 50.

Storage controller 22 contains standard logic circuits used to control the fetching or storing of instructions and operands. It is also used to perform dynamic address translation (DAT) or access-register translation (ART), along with any associated tasks. (DAT and ART are explained in detail in "IBM System/390 Principles of Operation", mentioned above.) In particular, storage controller 22 contains the logic circuits used to convert an address into an absolute address that can be used for a storage reference. Storage controller 22 is coupled to system storage 12 via a bus 52, to cache 14 via a bus 54 and to execution units/completion unit 24 via a bus 56.

Execution units/completion unit 24 are further coupled to cache 14 via buses 58 and 60, milli-mode detection unit via buses 62 and 66 and instruction decode unit 20, in general, via buses 64 and 66. Unit 24 is used to execute the instructions decoded by instruction decode unit 20. The availability of more than one instruction register and execution unit enables the system to execute more than one instruction per cycle. In particular, two or more set operand address control register instructions or two or more storage referencing instructions can be executed in one cycle.

In accordance with the principles of the present invention, when system 10 is placed in milli-code mode, as described below, one or more of operand address control registers 40 are used to provide storage referencing controls to storage controller 22 and ultimately to system storage 12. One example of the fields associated with an operand address control register is described in detail with reference to FIG. 2. In addition, a milli-instruction used to load the controls of an operand address control register is described with reference to FIGS. 3 and 4.

Figure 2:
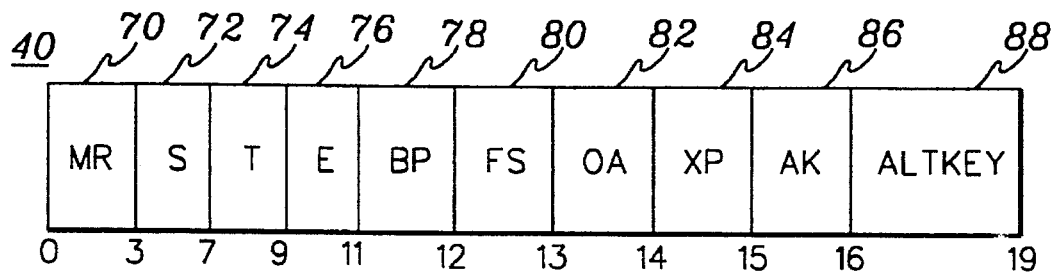
FIG. 2 depicts one example of the fields associated with an operand address control register, in accordance with the principles of the present invention.

Referring to FIG. 2, operand address control register 40 includes, for example, the following fields:

1. An associated milli-register field (MR) 70, which is a three bit field used to specify the associated milli-registers. Milli-registers are similar to general purpose registers, but are used when the system is in milli-code mode, in accordance with the principles of the present invention. In addition to general purpose milli-registers, there also can be milli-access registers (MAR). When the value of milli-register field 70 is equal to the value in bits 0:2 of the base register specified in a storage referencing milli-instruction, this operand address control register is used to further qualify the storage request.

2. An address space field (S) 72, which includes four bits used to specify the address space. The value in address space field 72 overrides the current logical setting of the address space in the program status word of system 10. (As is known, the program status word (PSW) contains information used in the execution of the currently active program running in system 10. In general, the program status word is used to control instruction sequencing and to hold and indicate much of the status of the system in relation to the program currently executing. One example of the program status word used in System 390 is described in detail in "IBM System/390 Principles of Operation," Form No. SA22-7201-00, which is hereby incorporated by reference.) The below listed table identifies one example of the bit settings used to indicate a specific address space. It will be apparent to one of ordinary skill in the art that other address spaces may be added to the table and that the below table is only exemplary.

| ADDRESS SPACE BIT SETTINGS | | |
|---|---|---|
| Address Space | S (binary) | S (hex) |
| Logical | 0000 | 0 |
| Real | 0001 | 1 |
| AR Virtual | 0010 | 2 |
| Absolute | 0011 | 3 |
| Primary Virtual | 0100 | 4 |
| Host Real | 0101 | 5 |
| System Area | 0111 | 7 |
| Home Virtual | 1000 | 8 |
| Secondary Virtual | 1100 | C |
| Host Primary Virtual | 1101 | D |
| Logical Virtual | 1110 | E |

Using the technique of the present invention and in particular, the address space field, it is possible for the system to be currently in one address space, such as the real address space, and a request can be satisfied to move data from the home virtual address space to the secondary virtual address space without having the system exit the real address space mode. As described in further detail below, the address space control in the operand address control register simply overrides the controls set in the program status word for the real address space, but it does not require changing the contents of the program status word.

3. An address truncation field (T) 74, which includes two bits used to specify if and how to truncate the address. As with the address space field, the value of address truncation field 74 overrides the current logical setting of the address truncation field in the program status word. One example of the address truncation bit settings are depicted in the table below.

| ADDRESS TRUNCATION BIT SETTINGS | | |
|---|---|---|
| Truncation | T (binary) | T (hex) |
| Use PSW(32), PSW(3) & PSW(4) (as appropriate) | 00 | 0 |
| 24 Bit | 01 | 1 |
| 31 Bit | 10 | 2 |
| >31 Bit | 11 | 3 |

4. An exception filter field (E) 76, which includes two bits used to block all protection exceptions, key protection, or access exceptions. As an example, the exception filter bit assignments include the following:

| EXCEPTION FILTER BIT ASSIGNMENTS | | |
|---|---|---|
| Function | E (binary) | E (hex) |
| NO-SPECIAL-REQUEST | 00 | 0 |
| BLOCK-ALL-PROTECTION | 01 | 1 |
| BLOCK-ACCESS-EXCEPTION | 10 | 2 |
| BLOCK-KEY-PROTECTION | 11 | 3 |

5. A block program event recording (PER) bit (BP) 78, which is used to block the program event recording storage alteration event detection on any store done by means of an operand address control register that specifies this request by setting bit 78 to one, as one example.

6. A fetch-store bit (FS) 80, which is used to indicate that fetch with store modifier is to be used. When a fetch is made by an operand address control register having fetch-store bit set, the fetch is returned normally. However, both fetch and store-type access exceptions are detected for the specified address. This is used in non-interruptible operations/functions where the store queue is to be released but there are still stores to be issued which may take access exceptions. These access exceptions are tested before releasing the queue to insure that nullification will occur, if an exception exists.

7. An operand address control register select bit (OA) 82, which is used by a set operand address control register milli-instruction (described in detail below) to select either OACR0 or OACR1. The OA select bit in the operand address control register is a don't care bit or it is hardwired to a binary 0 or a binary 1 depending on the hardware implementation.

8. An expansion bit (XP) 84, which is used to give other fields, such as the R1 field of the set operand address control register instruction, new meanings, as desired.

9. An alternate key bit (AK) 86, which is used to indicate that the key that is to be loaded into the alternate key register portion of operand address control register 40 is contained in bits 24:27 of the milli-register specified by the R1 field of the set operand address control register milli-instruction.

When bits 0:2 of the base register from a subsequent storage request match the value of milli-register field 70 of an associated operand address control register, alternate key bit 86 (if set) indicates that the alternate key in the operand address control register for this request is to be used.

10. An alternate key field (ALTKEY) 88, which is loaded from the R1 register of an associated set operand address control register milli-instruction when alternate key bit 86 of operand address control register 40 is set.

It will be apparent to one of ordinary skill in the art that the bit settings and assignments described above are only exemplary and that each of the above tables may be expanded without departing from the spirit of the invention.

In order to set the fields in an operand address control register, a set operand address control register milli-instruction 90 (FIG. 3) is used. Set milli-instruction 90 is also used to make instruction decode unit 20 aware that it is to monitor subsequent milli-instructions that reference storage to determine if the base registers used by those milli-instructions are associated with the operand address control register referenced by set operand address control register instruction 90.

Figure 3:
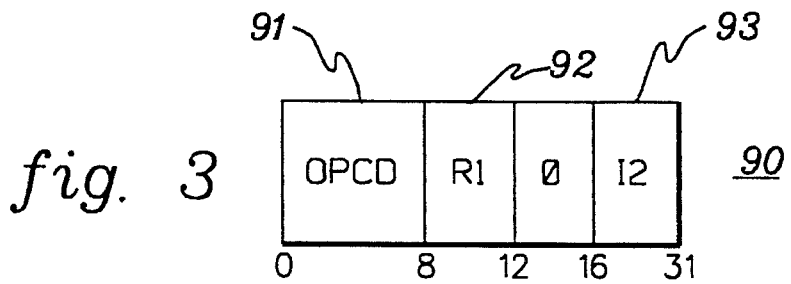
FIG. 3 depicts one example of the fields associated with a set operand address control register, in accordance with the principles of the present invention.

One embodiment of the set operand address control register milli-instruction is described in detail with reference to FIGS. 3 and 4. In one example, set operand address control register milli-instruction 90 includes the following fields: an operation code (OPCD) 91, which indicates to system 10 the function to be performed; an R1 field 92, which indicates the milli-register that contains the alternate key; and an immediate field (I2) 93, which includes a number of the controls associated with referencing system storage 12.

Figure 4:
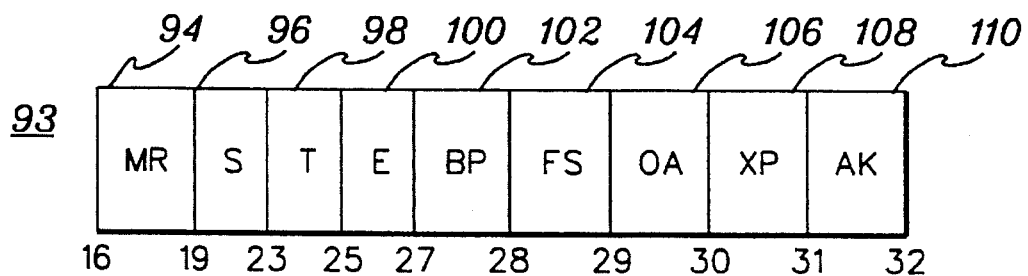
FIG. 4 depicts one embodiment of the fields associated with the immediate field of the set operand address control register of FIG. 3, in accordance with the principles of the present invention.

Referring to FIG. 4, in one embodiment, immediate field 93 includes a number of fields (bits 16 to 31), which are used to set the associated controls in operand address control register 40. The fields which are a part of the milli-instruction are the same fields described above for operand address control register 40 (excluding the altkey field). In particular, immediate field 93 includes an associated milli-register field (MR) 94; an address space field (S) 96; an address truncation field (T) 98; an exception filter field (E) 100; a block program event recording bit (BP) 102; a fetch-store bit (FS) 104; an operand address control register select bit (OA) 106; an expansion bit (XP) 108; and an alternate key bit (AK) 86. Each of the fields associated with immediate field 93 were described in detail previously in relation to operand address control register 40. However, additional information is provided below for a couple of the fields.

Associated milli-register field 94 (bits 16:18 of immediate field 93) specifies an even-odd milli-register pair (e.g., $MR_1$ and $MR_1+1$, where $MR_1$ is even), which is associated with operand address control register 40 as specified by operand address control register select bit 106. Thus, when subsequent storage references use either milli-register from the pair as a base register, the associated operand address control register is used to further qualify and control the storage reference. If only one base milli-register is needed for the storage operation, the other milli-register of the even-odd pair may be used for a purpose other than as a base register.

Operand address control register select bit 106 is used to select which of the two operand address control registers is to be associated with the base register and eventually used. If OACR0 is to be used, then operand address control register select bit 106 is set to zero. Likewise, if OACR1 is to be used, then select bit 106 is set to one.

In addition to the above, when alternate key bit 110 is set, R1 field 92 specifies a milli-register that contains the alternate key. The alternate key is located in bits 24:27 of the associated milli-register as designated by the R1 field. When the alternate key bit is not set, typically, R1 field 92 is zero.

In accordance with the principles of the present invention, when system 10 is processing it may be in either 390 mode or milli-code mode (390 mode is just one example. It is possible that a system may be in another mode, such as 370 mode, etc.). In general, during system operation, instruction decode unit 20 fetches an instruction from instruction registers 18 and decodes the instruction. As described below with reference to FIG. 5, the decoded instruction causes system 10 to either remain or enter in 390 mode or milli-code mode.

Figure 5:
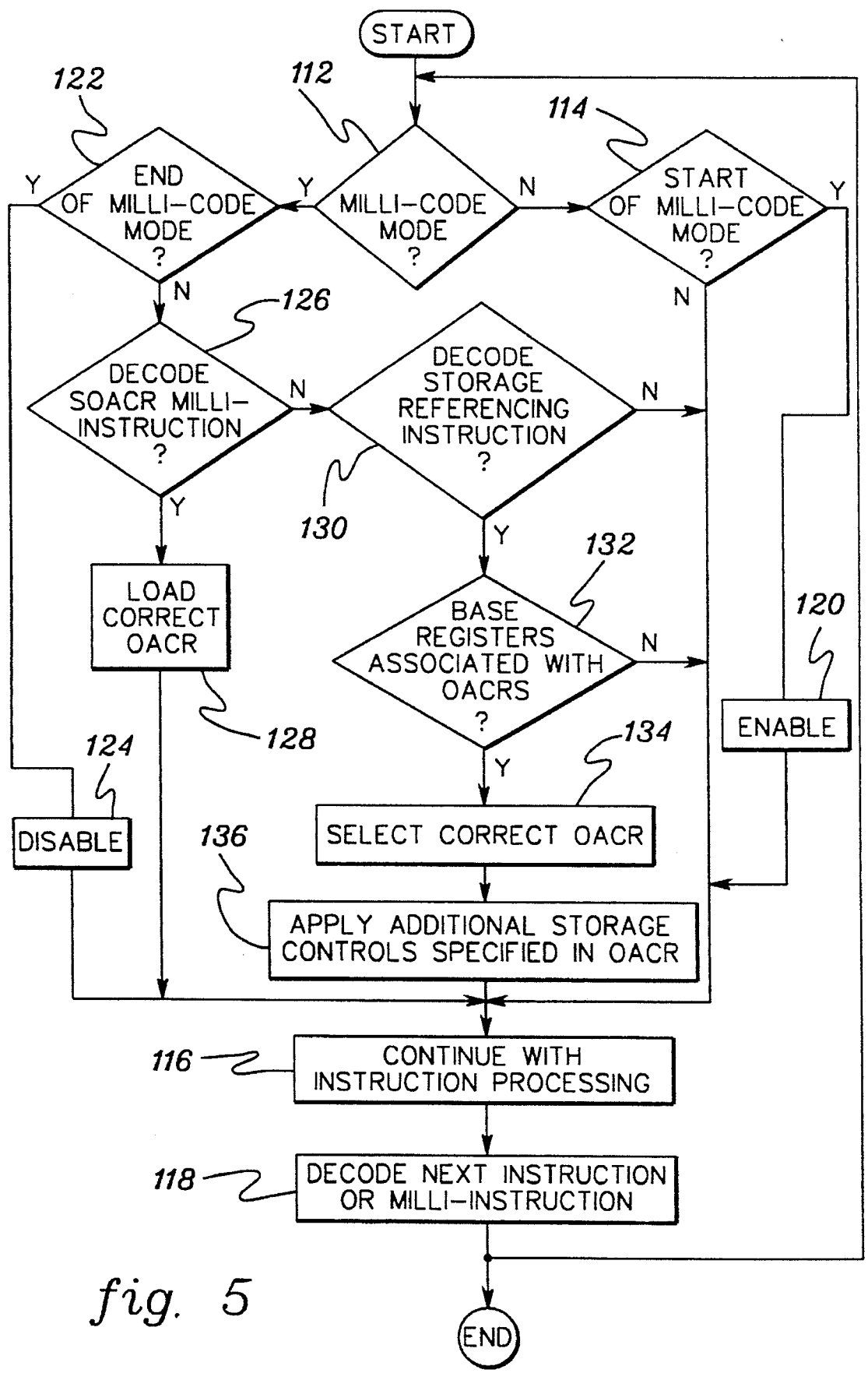
FIG. 5 depicts one example of the logic associated with the technique for referencing system storage, in accordance with the principles of the present invention.

Referring to FIG. 5, when instruction decode unit selects an instruction to be decoded, a determination is made as to whether system 10 is currently in milli-code mode, INQUIRY 112 "MILLI-CODE MODE?"

In order to make this determination, a bit located in, for example, the milli-mode detection unit is checked to see if it is set (e.g., equal to one). If the milli-mode detection bit is equal to zero, then system 10 is not currently running in milli-mode, but is running in, for instance, 390 mode. When system 10 is in 390 mode, another inquiry is made into whether milli-code mode is being started by the currently decoding instruction, INQUIRY 114 "START OF MILLI-CODE MODE?" The start of milli-code mode is detected when instruction decode unit 20 detects that the operation code of the currently executing instruction is one of the codes predetermined to run in milli-mode. Should the response to inquiry 114 be in the negative, then system 10 remains in 390 mode and the instruction continues to be processed, STEP 116 "CONTINUE WITH INSTRUCTION PROCESSING."

Thereafter, the next 390 instruction is retrieved from instruction registers 18, STEP 118 "DECODE NEXT INSTRUCTION OR MILLI-INSTRUCTION." In particular, when system 10 is in 390 mode, instructions originating in system storage 12 are fetched by instruction decode unit 20 via storage controller 22 and bus 52 and placed into cache 14 via bus 26. Subsequently, instructions are moved from the cache to instruction registers 18 and then, instruction decode unit 20 selects each of the instructions, decodes it, and dispatches it to execution units/completion unit 24 via bus 64. During instruction execution in the execution units, the execution units access information in cache 14 via buses 58 and 60. The execution of certain instructions changes processor state information needed by the instruction decode unit and the storage controller and this information is passed via buses 66 and 56, respectively. Information passed on bus 66 is also passed to milli-mode detection unit 36, in accordance with the principles of the present invention.

Returning to INQUIRY 114, if it is determined by the operation code of the executing instruction that a milli-code routine is to be used during execution, then milli-code mode is enabled, as described below, STEP 120 "ENABLE." Milli-code mode is enabled by setting the milli-code mode detection bit in milli-mode detection unit 36 to one. Subsequent to enabling milli-code mode, processing of the instruction continues, STEP 116 "CONTINUE WITH INSTRUCTION PROCESSING." During processing of the instruction that placed system 10 in milli-code mode, a milli-instruction associated with the milli-routine used in performing the function requested by the executing instruction is selected and executed, STEP 118 "DECODE NEXT INSTRUCTION OR MILLI-INSTRUCTION." In accordance with the principles of the present invention, instruction decode unit 20 fetches the milli-instruction from milli-code array 16. The instruction may originate from system storage and be passed to the milli-code array. Subsequently, the milli-code instruction is fetched via the controls of the decode unit from array 16 to instruction registers 18 and flow passes to INQUIRY 112. If there are no other instructions, processing ends.

Returning to INQUIRY 112, should system 10 be in milli-code mode, then a determination is made as to whether the end of milli-code mode is reached, INQUIRY 122 "END OF MILLI-CODE MODE?" Milli-code mode is ended when a currently executing milli-routine uses a milli-instruction, such as milli-end to terminate milli-code mode. If this is the end of milli-code mode, then milli-code mode is disabled by setting the milli-code mode detection bit to zero, STEP 124 "DISABLE." Subsequently, flow passes to STEP 116 "CONTINUE WITH INSTRUCTION PROCESSING." Subsequently, the next 390 instruction is decoded, STEP 118 "DECODE NEXT INSTRUCTION OR MILLI-INSTRUCTION."

On the other hand, if the end of milli-code mode has not been reached, then an inquiry is made into whether the milli-instruction being executed is set operand address control register (SOACR) instruction 90, described above, INQUIRY 126 "DECODE SOACR MILLI-INSTRUCTION?" This is determined by the operation code of the instruction. As described above, the set operand address control register milli-instruction is executed in instruction decode unit 20 and is used to load the contents of one of the operand address control registers. In addition, the set operand address control register milli-instruction associates a pair of milli-registers with one of the operand address control registers (i.e., OACR0 or OACR1). In one embodiment, an operand address control register is associated with an even-odd pair of milli-registers. It will be apparent to those skilled in the relevant art, that an operand address control register does not have to be associated with a pair of milli-registers or that an operand address control register can be associated with more than one pair. In addition, it will be apparent that an operand address control register may also contain multiple base register compare fields.

Should the instruction being decoded be a set operand address control register milli-instruction, then the operand address control register designated by operand access field 106 is loaded with the contents of immediate field 93, STEP 128 "LOAD CORRECT OACR." Then, execution of the current instruction continues, STEP 116 "CONTINUE WITH INSTRUCTION PROCESSING" and another milli-instruction is selected to be decoded by decode unit 20, STEP 118 "DECODE NEXT MILLI-INSTRUCTION."

Returning to INQUIRY 126, if the instruction being decoded is not a set operand address control register milli-instruction, then another determination is made as to whether the instruction being decoded is a storage referencing instruction, INQUIRY 130 "DECODE STORAGE REFERENCING INSTRUCTION?" If the instruction is not a storage referencing instruction as determined by the operation code of the instruction, then flow passes to STEP 116 and processing of the instruction continues.

Otherwise, returning to INQUIRY 130 if the executing instruction is a storage referencing instruction, such as a load, store, move character, insert character or system request, etc. (to name only a few examples), then a determination is made as to whether the base registers of the decoded instruction are associated with one or more of the operand address control registers, INQUIRY 132 "BASE REGISTERS ASSOCIATED WITH OACRS?" This determination is made by detect OACR usage unit 38, which compares the base register field in the executing instruction to the milli-register field of each of the operand address control registers. In particular, if the value of bits 0:2 of the base register equal the value of milli-register field 70 of an operand address control register, then the base registers are associated with the operand address control register, and thus, storage controls set in the operand address control register are used with the storage referencing instruction. These storage controls override the predefined controls associated with the storage referencing instructions that are set in the program status word or control registers. However, it does not replace the contents of the program status word or the control registers. (It will be apparent to those skilled in the relevant art that there are numerous storage referencing instructions and each one of those instructions may be executed in milli-code mode, if desired.)

If detect OACR usage unit 38 determines that the base registers are not associated with any of the operand address control registers, then instruction processing continues, STEP 116 "CONTINUE WITH INSTRUCTION PROCESSING." Otherwise, flow passes to STEP 134 "SELECT CORRECT OACR." The correct operand address control register is that register whose milli-register field 70 matches the value in the base register. After the correct operand address control register is selected, the storage controls set in the selected control register are applied to the storage reference requested by the storage referencing instruction, STEP 136 "APPLY ADDITIONAL STORAGE CONTROLS SPECIFIED IN OACR."

In particular, the controls specified in the operand address control register associated with the base register is passed to storage controller 22 via bus 50. In accordance with the principles of the present invention, these controls are used in referencing system storage. These controls override the logical controls set in either, for example, the program status word or control registers. However, the values in the program status word or control registers are not replaced. Subsequent to applying the additional controls, instruction processing continues, as described above, STEP 116 "CONTINUE WITH INSTRUCTION PROCESSING."

Described above is a technique for referencing storage using milli-code instructions. The following example of a 390 instruction implemented with a milli-code routine is the 390 instruction referred to as Extract Stacked State. The System 390 definition of this instruction is described in detail in the Principles of Operations, which are mentioned previously. The format of the Extract Stacked State instruction is ESTA R1, R2 [RRE], wherein ESTA represents the mnemonic for the Extract Stacked State instruction; R1 and R2 contain the associated registers for the instruction; and RRE denotes a register and register operation with an extended operation code field.

Figure 6:
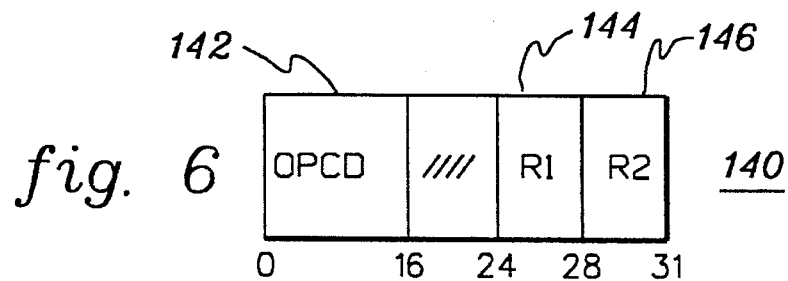
FIG. 6 depicts one example of an instruction issued in milli-code mode, in accordance with the principles of the present invention.

One embodiment of the Extract Stacked State instruction is depicted in FIG. 6. Referring to FIG. 6, in one example, Extract Stacked State instruction 140 includes an operation code 142, which describes to system 10 the operation which is to be performed; an R1 field 144, which designates the even numbered register of an even-odd pair of general registers; and an R2 field 146, which contains the general register from which information is to be extracted.

When the Extract Stacked State instruction is issued, the contents of one of the four 8-byte fields immediately proceeding the entry descriptor of the last state entry in the linkage stack are placed in the pair of general registers designated by the R1 field. Bits 24 to 31 of the general register designated by the R2 field represent an unsigned binary integer that is used to select the state-entry byte positions from which information is to be extracted, as follows:

| Value of Bits 24–31 of General Register R2 | State Entry Byte Positions Selected |
| --- | --- |
| 0 | 128–135 |
| 1 | 136–143 |
| 2 | 144–151 |
| 3 | 152–159 |

The format of the byte positions listed in the above table under "State Entry Byte Positions Selected" is described in detail in the Principles of Operations, which is mentioned above.

One example of a portion of the milli-code used to perform the Extract Stacked State function is listed below. In particular, the milli-code described below is for the first fetch of the stacked state of the linked stacked entry:

```
        EJECT
ESTA    EMH     R15,CR15    Logical CR15 to MR15
        SOAC0   R14,HOME+ADR31+NOKEY
*                           Home Virtual, 31-BIT, use
*                           OACR0, Block-Key protect
*                           for MR14 and MR15 base reg.
        SRL     R15,3
        SLL     R15,3
*                           Zero last 3 bits MR15, addr
*                           of Entry Descriptor (ED) in
*                           the Link Stack Entry (LSE)
FETCH1  L       R3,0(,R15)
*                           Entry Descriptor of the LSE
*                           to (Milli-Register 3) MR3
```

Referring to the code listed above, ESTA refers to the mnemonic for the Extract Stacked State instruction; EMH is the name of the milli-instruction that moves the contents of control register 15 to a milli-register 15; SOAC0 is a mnemonic for the set operand address control register instruction used to set the controls in OACR0; the HOME+ADR31+NOKEY sets home virtual, 31-bit addressing and blocks key protection for milli-register 14 and milli-register 15, which are the base registers; SRL refers to shift right logical; SLL refers to shift left logical; and L refers to a load operation.

By using the above-described milli-instruction routine to extract data from the linkage stack, controls associated with the function, such as the address space (home virtual), the address truncation (31-bit) and the exception filter (block key protect) are set in an operand address control register using a set operand address control register milli-instruction. These controls are then passed to the storage controller and used during the storage referencing of the link stack. This technique provides for the overriding of the controls that are currently set in the system in the program status word or control registers without requiring replacement of those controls.

Figure 7:
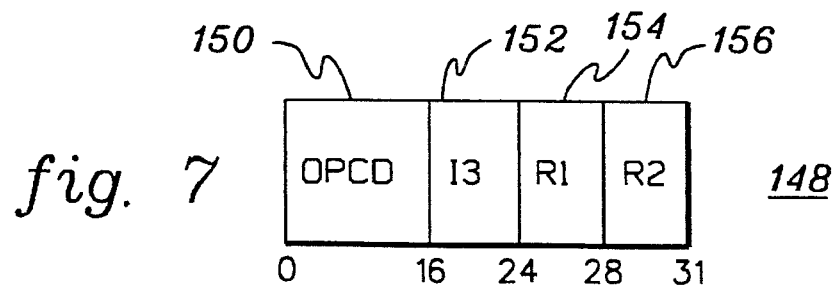
FIG. 7 depicts one example of the fields associated with a system request instruction, in accordance with the principles of the present invention.

In addition to the above, numerous storage referencing instructions require the changing of controls in the storage controller, such as for example, the translation-lookaside buffers or the access-register translation-lookaside buffers, which are described in detail in the Principles of Operation, mentioned above. In order to perform the functions required by these more complicated instructions, in accordance with the principles of the present invention, a system request instruction is used.

one embodiment of a system request instruction is depicted in FIG. 7. As depicted, system request instruction 148 includes an operation code (OPCD) 150, which is used to indicate to system 10 that the instruction being executed is a system request instruction; an immediate field (I3) 152, which includes a code indicative of the type of system request to be performed, as described below; an R1 field 154, which is a sink for data returned by the system request; and an R2 field 156, which supplies an address, if one is expected by the specific request.

In accordance with the principles of the present invention, if R2 is treated as a base register, then an operand address control register can be associated with the system request instruction, thus providing further controls to the system controller. This eliminates the need for having an instruction for every function to be performed. For instance, if an operand address control register is not used, then if an instruction, such as insert storage key is to be used on a real or absolute address, there would need to be a separate instruction to handle insert storage key real and another for insert storage key absolute. However, by associating an operand address control register with the system request instruction, one insert storage key instruction can be implemented in milli-code and the type of address (i.e., real or absolute) may be provided by the operand address control register.

One example of the type of functions that can be implemented using the system request instruction is listed in the below table. It will be apparent to one of ordinary skill in the art that the below table is only exemplary and there are many other functions that can be implemented by using the system request instruction.

| FUNCTION/ MNEMONIC | I3 CODE | OACR ADDRESS (S) FIELD TAGS | R1 | R2 | SETS MCC |
| --- | --- | --- | --- | --- | --- |
| IPTE | '26'x | ABS | 0 | b | N |
| ISK | '42'x | REAL,ABS, HREAL | a | b | N |
| LRA | '58'x | AR,PRIM,HOME, SEC,HPRIM,VIRT | a | b | Y |
| PALB | '17'x | n/a | 0 | 0 | N |
| PTLB | '07'x | n/a | 0 | 0 | N |
| RRB | '1B'x | REAL,HREAL, | 0 | b | Y |
| SSK | '23'x | REAL,HREAL, | 0 | a | N |
| TAR | '19'x | AR | 0 | c | Y |
| TPROT | '1F'x | LOG | 0 | b | Y |

Referring to the above table, the abbreviations represent the following: MCC refers to milli-condition code; ABS refers to absolute; REAL refers to a real address; HREAL refers to host real; PRIM refers to primary; SEC refers to secondary; HPRIM refers to host primary; VIRT refers to virtual; AR refers to access register; LOG refers to logical; "a" refers to milli-register; "b" refers to a milli-access register/milli-register pair, if greater than 31 bit addressing is used; "c" refers to milli-access register; and "d" refers to milli-access register/milli-register pair. In addition, each of the above functions is described in detail below.

The invalidate page table entry (IPTE) function requires a partial purge of the translation lookaside buffers (TLB). The address in the milli-register of the milli-access register/ milli-register (MAR/MR) pair specified by R2 is interpreted as a page frame real address (PFRA). All TLB entries formed using this page frame real address are purged. Bits 20:23 of the address are set from bits 16:19 of the virtual address. Bits 24:31 of the address are zeros. Milli-code uses an operand address control register with absolute as the S field setting for this operation. In one embodiment, milli-code uses this for implementing the 390 invalidate page table entry instruction.

The insert storage key (ISK) function is also performed by the system request instruction. The storage key of the 4k-block that is specified by the address from the milli-register (or MAR/MR pair) indicated by the R2 field is returned. Milli-code establishes the address is real, real primary, or absolute and uses the appropriate truncation. The bits of the address up through bit 19 are used to specify the 4k-block. The key is returned in bits 24:30 of the milli-register specified by R1; the access control bits are returned in bits 24:27; the fetch protect bit is returned in bit 28; the reference bit is returned in bit 29; and the change bit is returned in bit 30. Bit 31 of the milli-register is set to zero. The remaining bits of R1 are unchanged. This command does not modify the reference or change bits.

Another function specified by the system request instruction is load real address (LRA). The address from the milli-register (MAR/MR) specified by R2 is translated. For this command, milli-code establishes the address is virtual and uses the appropriate truncation (for the load real address instruction, the second-operand address is always interpreted by the hardware as a virtual address). The address is translated by storage controller 22, in accordance with the procedure described in "International Business Machines System 370 Extended Architecture Interpretative Execution," Publication No. SA22-7095-1, which is hereby incorporated by reference, using the translation information in the host/guest control registers. The translation lookaside buffer is bypassed (the translation lookaside buffer is used for the intermediate translations for a pageable guest). The resulting translation data is available in R1 milli-register. The condition code is available in a milli-condition code, referred to as milli-CC (MCC). When the translation is successful, milli-CC is set to zero and the real address is returned.

The purge access register translation lookaside buffer (PALB) function purges the access register portion of the lookaside buffer in the storage controller.

Similarly, the purge translation lookaside buffer (PTLB) purges the translation lookaside buffer in the storage controller, as well as in the cache.

The reset reference bit (RRB) function is also performed using the system request instruction. The reference bit in the storage key of the 4k-block that is specified by the address from the milli-register (or MAR/MR pair) indicated by the R2 field is reset. Milli-code establishes the address is real or real primary and uses the appropriate truncation. The bits of the address up through bit 19 are used to specify the 4k-block. The milli-CC is set to the value of the concatenation of the initial reference and change bits. This command does not modify he change bit. The resulting conditions codes are as follows:

```
0 - R=0, C=0
1 - R=0, C=1
2 - R=1, C=0
3 - R=1, C=1
```

Another function performed under the direction of the system request instruction is set storage key (SSK). The storage key of the 4k- block that is specified by the address from the milli-register (or MAR/MR pair) indicated by the R2 field is replaced. Milli-code establishes the address is real, real primary or absolute and uses the appropriate truncation. The bits of the address up through bit 19 are used to specify the 4k-block. The contents of the bits 20:26 of the address replace the storage key (bits 20:23 are the access control bits, bit 24 is the fetch protect bit, bit 25 is the reference bit and bit 26 is the change bit). All key entries for this address are purged.

Another command that may be issued with the system request instruction is test access (TAR). The contents of the MAR specified by R2 is subjected to access register translation in the storage controller. Milli-code uses an operand address control register specifying AR virtual for this command.

In addition to the above is the test protect function (TPROT). The address from the milli-register (or MAR/MR pair) specified by R2 is tested for access and protection exceptions. This command is issued after a set operand address control register instruction has set up an alternate key. Milli-CC is set to 3 if translation (ART or DAT) exceptions are encountered (same ART exceptions as returned for the load real address instruction). The translation lookaside buffer entry and/or access register lookaside buffer entry are used if a hit occurs. The milli-CC is set to zero, if fetching and storing are permitted. Milli-CC is set to one, if fetching is permitted, but storing is not. Milli-CC is set to two, if neither fetching or storing are permitted. Translation lookaside buffers and access register translation lookaside buffer entries may be created. Access list control protection, low address protection, page protection and key control protection are all tested by this command. Key control protection is not tested if block key protection is requested.

In operation, when system 10 decodes a system request instruction, which issues one of the above functions or another function, immediate field 152 of system request instruction 148 is passed to the storage controller via bus 42. This information is used along with the information from the associated operand address control register or registers to update controls in the storage controller.

Described above is a method and system for controlling references to system storage without replacing the controls of the system that are stored in, for instance, a program status word or one or more control registers. Also described is a technique for issuing system requests. Milli-code provides flexibility to the system by enabling controls associated with storage references to be overridden.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for controlling references to system storage in a data processing system, said data processing system comprising a storage controller for processing said references to system storage, said method comprising the steps of:

issuing a reference to system storage, said reference having an address and a plurality of storage controls associated with said reference, each of said plurality of storage controls having a predefined value stored within at least one first control register presentable to said storage controller by said processor, one or more of said plurality of storage controls defining how said address is interpreted by said storage controller;

overriding said predefined value of said one or more of said plurality of storage controls without replacing said predefined value, said overriding comprising said processor presenting at least one second control register and said at least one first control register to said storage controller, said at least one second control register containing at least one storage control that overrides said one or more of said plurality of storage controls without replacing said predefined value of said at least one first controller register; and executing said reference to system storage using said one or more of said plurality of storage controls that have been overridden.

2. The method of claim 1, wherein said overriding step comprises the steps of:

loading a predetermined value for one or more of said plurality of storage controls in said at least one second control register; and using said at least one second control register in said issued reference to system storage.

3. The method of claim 2, wherein said at least one second control register includes a register field and wherein said using step comprises a step of setting said register field equal to a base register field of said issued reference to system storage.

4. The method of claim 2, wherein said data processing system comprises a set instruction and wherein said loading step is performed in response to said set instruction.

5. The method of claim 3, wherein said data processing system comprises a set instruction and wherein said register field is set in response to said set instruction.

6. The method of claim 1, further comprising a step of placing said data processing system in a milli-code mode.

7. The method of claim 6, wherein said placing step comprises a step of setting a milli-code mode detection bit to a first value.

8. The method of claim 7, further comprising a step of removing said data processing system from said milli-code mode.

9. The method of claim 8, wherein said removing step comprises a step of setting said milli-code mode detection bit to a second value.

10. The method of claim 2, wherein said loading comprises loading a value in one or more of said plurality of storage controls, said plurality of storage controls comprising an address space control, an address truncation control, an exception filter control, a block program event recording control, a fetch-store control, an expansion bit control, an alternate key control, a control register control and an alternate key.

11. The method of claim 10, wherein said predefined value for said address space control is equal to a first address space and wherein said overriding step includes overriding said predefined value.

12. The method of claim 1, wherein said storage controller includes a plurality of controls, and said method further comprises a step of updating one or more of said plurality of controls.

13. The method of claim 12, wherein said updating step comprises using a system request instruction to update said one or more of said plurality of controls.

14. The method of claim 13, further comprising a step of accessing by said system request instruction said at least one second control register for use in up dating said one or more of said plurality of controls.

15. The method of claim 14, wherein said control register comprises a register field, said system request instruction comprises a base register field and said associating step comprises the step of setting said base register field equal to said register field.

16. A system for controlling references to system storage in a data processing system, said data processing system comprising a processor and a storage controller for processing said references to system storage, said system comprising:

means for issuing a reference to system storage, said reference having an address and a plurality of storage controls associated with said reference, each of said plurality of storage controls having a predefined value storable within at least one first control register presentable to said storage controller by said processor, one or more of said plurality of storage controls defining how said address is interpreted by said storage controller;

means for overriding said predefined value of said one or more of said plurality of storage controls without replacing said predefined value, said means for overriding comprising means for said processor presenting at least one second control register and said at least one first control register to said storage controller, said at least one second control register containing at least one storage control that overrides said one or more of said plurality of storage controls without replacing said predefined value of said at least one first control register; and means for executing said reference to system storage using one or more of said plurality of storage controls that have been overridden.

17. The system of claim 16, wherein said overriding means comprises:

means for loading a predetermined value for one or more of said plurality of storage controls in said at least one second control register; and means for using said at least one second control register in said issued reference to system storage.

18. The system of claim 17, wherein said at least one second control register further comprises a register field and said means for using comprises means for setting said register field equal to a base register field of said issued reference to system storage.

19. The system of claim 17, wherein said loading means comprises a set instruction for loading said predetermined values.

20. The system of claim 18, wherein said means for setting comprises a set instruction for setting said register field.

21. The system of claim 16, further comprising means for placing said data processing system in a milli-code mode.

22. The system of claim 21, wherein said data processing system further comprises a milli-code mode detection unit, said milli-code mode detection unit comprising a milli-code mode detection bit.

23. The system of claim 22, wherein said placing means comprises means for setting said milli-code mode detection bit to a first value.

24. The system of claim 22, further comprising means for removing said data processing system from said milli-code mode.

25. The system of claim 24, wherein said removing means comprises means for setting said milli-code mode detection bit to a second value.

26. The system of claim 17, wherein said means for loading comprises means for loading a value in one or more of said plurality of storage controls, said plurality of storage controls comprising an address space control, an address truncation control, an exception filter control, a block program event recording control, a fetch-store control, an expansion bit control, an alternate key control, a control register control and an alternate key.

27. The system of claim 16, wherein said storage controller is includes a plurality of controls, and wherein said system further comprises:

means for updating one or more of said plurality of controls.

28. The system of claim 27, wherein said means for updating is responsive to a system request instruction.

29. The system of claim 28, further comprising means for using said at least one second control register with said system request instruction.

30. The system of claim 29, wherein said at least one second control register comprises a register field, said system request instruction comprises a base register field and said means for using comprises means for setting said base register field equal to said register field.

31. The system of claim 16, further comprising an instruction register, said instruction register containing said reference to system storage.

32. The system of claim 31, further comprising an instruction decode unit coupled to said instruction register, said instruction decode unit receiving said stored reference to system storage from said instruction register, said instruction decode unit comprising said overriding means.

33. The system of claim 31, further comprising a plurality of instruction registers, each instruction register of said plurality of instruction registers receiving an instruction comprising a reference to system storage.

34. The system of claim 33, further comprising a milli-code array coupled to said plurality of instruction registers, said milli-code array passing said references to system storage to said plurality of instruction registers.

35. A system for controlling references to system storage in a data processing system while in milli-code mode, said system comprising:

a milli-code array coupled to said system storage for storing references to system storage, each of said references to system storage having an address and having a plurality of storage controls associated with the reference, each of said plurality of storage controls having a predefined value, one or more of said plurality of storage controls defining how said address is interpreted;

one or more instruction registers coupled to said milli-code array, said one or more instruction registers receiving said references to system storage from said milli-code array;

an instruction decode unit coupled to said one or more instruction registers, said decode unit comprising means for overriding said predefined value for said one or more of said plurality of storage controls without replacing said predefined value, while in said milli-code mode; and one or more execution units coupled to said instruction decode unit for executing said reference to system storage.

36. The system of claim 35, wherein said instruction decode unit comprises an operand address control register, said operand address control register comprising a predetermined value for one of said plurality of storage controls, said predetermined value overriding said predefined value of a corresponding storage control.

37. The system of claim 35, wherein said instruction decode unit further comprises a milli-code mode detection unit for determining whether said system is in milli-code mode.

38. The system of claim 35, further comprising:

a storage controller coupled to said instruction decode unit, said storage controller comprising a plurality of control values; and a system request instruction for updating said plurality of control values in said storage controller.

* * * * *

UNITED STATES PATENT AND TRADEMARK OFFICE
CERTIFICATE OF CORRECTION

PATENT NO. : 5,615,354
DATED : March 25, 1997
INVENTOR(S) : Hill et al.

It is certified that error appears in the above-identified patent and that said Letters Patent is hereby corrected as shown below:

Col. 11, line 26, delete "one" and replace with --One--.
Col. 15, line 22, delete "up dating" and replace with --updating--.

Signed and Sealed this

Twenty-fourth Day of June, 1997

Attest:

Attesting Officer

BRUCE LEHMAN
Commissioner of Patents and Trademarks